F. PORTILLO.
TOOL FOR OPENING AND STRETCHING SHEARS.
APPLICATION FILED APR. 28, 1909.
990,499.
Patented Apr. 25, 1911.
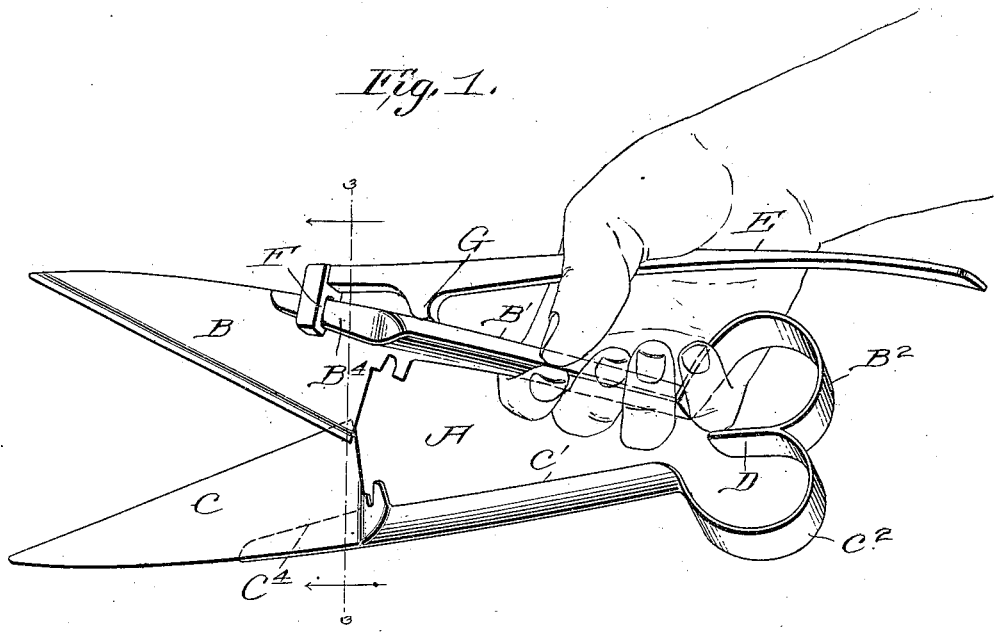
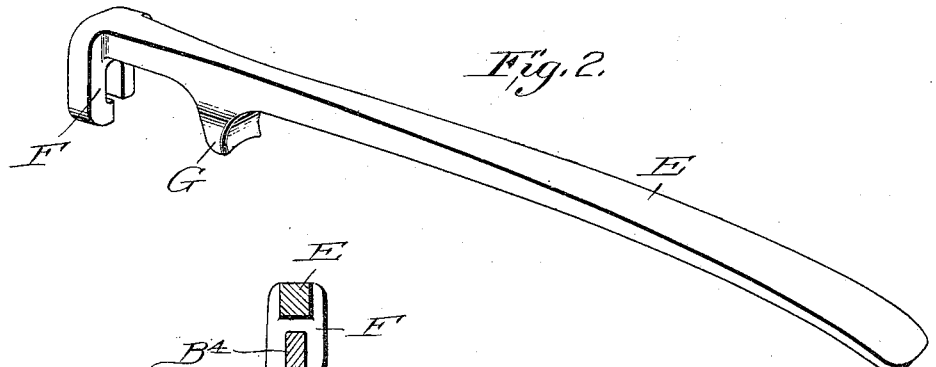
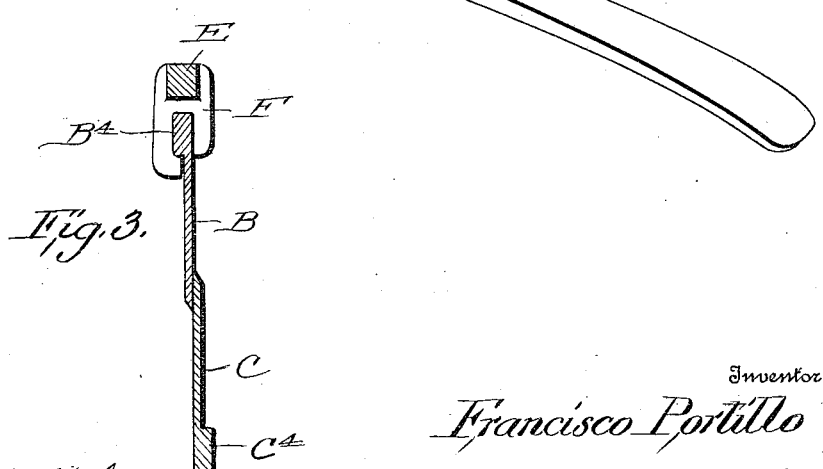
Inventor
Francisco Portillo

UNITED STATES PATENT OFFICE.

FRANCISCO PORTILLO, OF MODESTO, CALIFORNIA, ASSIGNOR OF ONE-HALF TO ANGELA PORTILLO, OF MODESTO, CALIFORNIA.

TOOL FOR OPENING AND STRETCHING SHEARS.

990,499. Specification of Letters Patent. Patented Apr. 25, 1911.

Application filed April 28, 1909. Serial No. 492,681.

*To all whom it may concern:*

Be it known that I, FRANCISCO PORTILLO, a citizen of the United States, residing at Modesto, in the county of Stanislaus and State of California, have invented a new and useful Improvement in Tools for Opening and Stretching Shears, of which the following is a specification.

This invention relates to certain new and useful improvements in tools for opening and stretching shears when they are first bought which is known as airing shears, the object being to provide a tool which is exceedingly simple and cheap in construction and one which can be placed in position on any of the well known makes of shears now in use.

A further object of the invention is to provide a tool with a heel which forms a fulcrum so that when pressure is applied to the end of the handle the forward end of the tool which is secured to the blade of the shears will be drawn upwardly.

A still further object of the invention is to provide a tool with an open loop at its forward end which is adapted to fit over the tapering flange of the blade of the shears in such a manner that all danger of it becoming detached when pressure is applied to the tool is prevented.

With these objects in view, my invention consists of the novel features of construction, combination and arrangement of parts hereinafter fully described, pointed out in the claims and shown in the accompanying drawings, in which, Figure 1 is a perspective view of my improved tool showing application of the same. Fig. 2 is a perspective view of my improved tool. Fig. 3 is a section taken on line 3—3 of Fig. 1.

In the drawings A indicates a pair of shears provided with blades B and C having handle portions B' and C' terminating in spring bowed loops B² and C² which are joined together at D forming a spring for holding the handles apart. Each of the handles is provided with flanges B⁴ and C⁴ which taper as clearly shown at the end adjacent the blades and are rolled to form smooth gripping portions in order that the hand will not be injured when grasped by the same, the above description being given so that the operation of my improved tool can be readily understood.

My improved tool comprises a handle E which is slightly curved as clearly shown and is provided with a spring split loop F at one end which is of such a shape and size that it will fit over the flange of an ordinary pair of shears. This loop is adapted to be placed over the flange of the blade of the shears from the forward end and it will be seen that the flange tapers in such a manner that after the loop has been placed over the same and drawn rearwardly it will be held thereon by frictional contact without danger of it becoming accidentally detached. Extending downwardly from the handle adjacent the spring loop is a heel G which is provided with a concave rounded bearing portion adapted to fit over the rolled portion of the handle of the blade of the shears so that it will be held thereon whereby all danger of it sliding off to one side is prevented.

It will be seen that as the handle is pressed downwardly it is the tendency of the split loop to be drawn rearwardly. This heel forms a fulcrum so that when placed in position on a pair of shears and the handle of the shears and the handle of the tool is grasped by the hand and pressure applied to the same the shears will be opened without any danger of injuring the hands in any way thereby overcoming the difficulties now existing, as with sheep shears when they are purchased it is necessary to open the same to enable the shears to be used easily.

The method now employed for opening shears of this character, is to wrap the blades with cloth so that the same can be grasped in order to pull them apart but the operator risks injury to his hands.

It will also be seen that this tool can be used for stretching and truing the shears as when the same is in position on the blade it is only necessary to give the handle a slight twist which will throw the blade to either side desired.

From the foregoing description it will be seen that I have provided a tool which is especially adapted to be used with sheep shears for airing the same whereby a pair of shears when purchased can be easily and quickly opened so that they can be readily used without any danger of injuring the hands in any way.

What I claim is:—

1. The combination with a pair of spring actuated shears, of a tool for stretching said shears comprising a handle, a loop formed at one end of said handle engaging the blade of the shears and a heel formed on said handle adjacent said loop, engaging the shank of the blade.

2. The combination with a pair of sheep shears, of a tool for opening and stretching said shears, comprising a curved blade, a split open spring loop formed at one end of said handle placed over the blade, of a pair of shears and a heel formed on said handle engaging the shank of the blade of the shears, said heel having a rounded bearing portion engaging the shank of the blade.

FRANCISCO PORTILLO.

Witnesses:
JOSEPH LOPEZ,
L. F. WRIGHT.

Copies of this patent may be obtained for five cents each, by addressing the "Commissioner of Patents, Washington, D. C."